United States Patent [19]

Ohgoda et al.

[11] Patent Number: 4,704,529
[45] Date of Patent: Nov. 3, 1987

[54] RADIATION IMAGE RECORDING APPARATUS WITH A MOVABLE RECORDING TABLE UNIT

[75] Inventors: Makoto Ohgoda; Kaoru Tamura, both of Kanagawa, Japan

[73] Assignee: Fuji Photo Film Co., Ltd., Japan

[21] Appl. No.: 786,087

[22] Filed: Oct. 10, 1985

[30] Foreign Application Priority Data

Oct. 15, 1984 [JP] Japan ................................. 59-214297
Oct. 15, 1984 [JP] Japan ................................. 59-214298
Oct. 15, 1984 [JP] Japan ................................. 59-214299

[51] Int. Cl.4 ............................................. G01T 1/10
[52] U.S. Cl. .................................. 250/327.2; 271/243; 378/181
[58] Field of Search .................. 250/327.2, 484.1, 337; 378/181, 187, 182, 173, 172; 271/243

[56] References Cited

U.S. PATENT DOCUMENTS

4,456,239 6/1984 Yamaguchi .......................... 271/3.1

Primary Examiner—Janice A. Howell
Assistant Examiner—Constantine Hannaher
Attorney, Agent, or Firm—Gerald J. Ferguson, Jr.; Michael P. Hoffman; Michael J. Foycik, Jr.

[57] ABSTRACT

A radiation image recording apparatus for recording a radiation image of an object at a variable height comprises a delivery stationary transfer mechanism and a receiving stationary transfer mechanism fixedly provided spaced from each other. A recording table unit which is movable back and forth between the stationary transfer mechanisms and is provided with a receiving transfer mechanism for introducing a recording medium sheet into the recording table unit and a delivery transfer mechanism for discharging the recording medium sheet from the recording table unit. At least a pair of relay transfer mechanisms which are movable in the direction of movement of the recording table unit integrally with each other, one between the delivery stationary transfer mechanism and the receiving transfer mechanism, and the other between the receiving stationary transfer mechanism and the delivery transfer mechanism. The relay transfer mechanisms are movable within a range in which the spaces between the delivery stationary transfer mechanism and said one relay transfer mechanism, between the receiving transfer mechanism and said one relay transfer mechanism, between the delivery transfer mechanism and said other relay transfer mechanism and between the receiving stationary transfer mechanism and said other relay transfer mechanism are not larger than the length of the recording medium sheet.

18 Claims, 4 Drawing Figures

FIG.3 ary, the primary object of the present invention is to
RADIATION IMAGE RECORDING APPARATUS WITH A MOVABLE RECORDING TABLE UNIT

BACKGROUND OF THE INVENTION

1. Field of the Invention

This invention relates to a radiation image recording apparatus, and more particularly to a radiation image recording apparatus for recording a radiation image of an object on a recording medium sheet such as an X-ray film or a stimulable phosphor sheet in which the recording position is movable.

2. Description of the Prior Art

There has been known a standing position type radiation image recording apparatus in which a recording table unit is supported to be movable up and down and to be located at a desired height, and in which a recording medium holder such as a cassette or a magazine loaded with a recording medium sheet is manually set in and taken out from the recording table unit. The known radiation image recording apparatus in which the recording medium holder is manually set in the recording table unit before recording and is manually taken out therefrom after recording is not suitable for continuous recording.

There has been proposed a radiation image recording apparatus suitable for continuous recording in which a pair of stationary transfer means are fixedly provided spaced from each other, and a recording table unit is provided to be movable between the pair of stationary transfer means so that a new recording medium sheet is fed to the recording table unit by way of one of the pair of stationary transfer means and an exposed recording medium sheet is discharged from the recording table unit by way of the other stationary transfer means. A receiving transfer means is provided at the entrance of the recording table unit to positively receive the recording medium sheet from said one stationary transfer means and to introduce the recording medium sheet into the recording table unit, and a delivery transfer means is provided at the exit of the recording table unit to deliver the recording medium sheet to said the other stationary transfer means.

In this radiation image recording apparatus, a new recording medium sheet is automatically introduced into the recording table unit by way of said one of the pair of stationary transfer means while the exposed recording medium sheet is automatically discharged to said the other transfer means, and thus continuous recording can be accomplished.

However, in order to successfully transfer the recording medium sheet between the recording table unit and the stationary transfer means without possibility of damage to the recording medium sheet, it is preferred that the recording medium sheet is transferred therebetween while being constantly held by at least one of the stationary transfer means and the receiving transfer means or the delivery transfer means. This requires that the space between said one stationary transfer means and the receiving transfer means and the space between said the other stationary transfer means and the delivery transfer means be kept smaller than the length of the recording medium sheet. Therefore, the recording table unit cannot be movable over a distance larger than the length of the recording medium sheet, and accordingly the recording table unit cannot be moved to a position suitable for recording a part of the object depending on the position of the part.

SUMMARY OF THE INVENTION

In view of the foregoing observations and description, the primary object of the present invention is to provide a radiation image recording apparatus in which the recording medium sheet can be automatically and positively transferred to and from the radiation image recording table unit.

The radiation image recording apparatus in accordance with one aspect of the present invention comprises a delivery stationary transfer means and a receiving stationary transfer means fixedly provided spaced from each other, a recording table unit which is movable back and forth between the delivery stationary transfer means and the receiving stationary transfer means, and is provided with a receiving transfer means for introducing a recording medium sheet into the recording table unit and a delivery transfer means for discharging the recording medium sheet from the recording table unit, and at least a pair of relay transfer means which are movable in the direction of movement of the recording table unit integrally with each other, one between the delivery stationary transfer means and the receiving transfer means, and the other between the receiving stationary transfer means and the delivery transfer means, the recording table unit and the relay transfer means being movable within a range in which the spaces between the delivery stationary transfer means and said one relay transfer means, between the receiving transfer means and said one relay transfer means, between the delivery transfer means and said the other relay transfer means and between the receiving stationary transfer means and said the other relay transfer means are not larger than the length of the recording medium sheet.

In the radiation image recording apparatus of the present invention, the relay transfer means do not prevent movement of the recording table unit, and at the same time, receive and deliver the recording medium sheet between the stationary transfer means and the transfer means in the recording table unit. Accordingly, even if the stationary transfer means and the transfer means in the recording table unit opposed thereto are spaced from each other by a distance substantially equal to the length of the recording medium sheet, the recording medium sheet can be positively delivered and received while being constantly held by at least one of the transfer means. Therefore, the recording table unit can be movable over a larger distance.

In accordance with another aspect of the present invention, each transfer means comprises a pair of rollers at least one of which is driven by an endless driving force transmission means such as a chain or a timing belt. Each driving roller (one of the rollers of each transfer means to be driven) is provided with an engagement portion which is adapted to be drivingly engaged with the endless driving force transmission means and which may be a chain sprocket if the endless driving force transmission means is a chain and may be a timing gear if the endless driving force transmission means is a timing belt. The outer diameter of the engagement portion of each driving roller, e.g., the pitch diameter in the case of a chain sprocket, is selected to be substantially equal to the outer diameter of the roller.

This arrangement is advantageous in that even when the recording table unit is moved and the relay transfer means are moved in response to the movement of the recording table unit with the recording medium sheet being simultaneously sandwiched by rollers of two transfer means, i.e., the delivery stationary transfer means and the relay transfer means, or the relay transfer means 8a and the receiving transfer means 6a, during transfer of the recording medium sheet to the recording table unit, the transfer velocities of the recording medium sheet by the pair of rollers of the transfer means as seen from the stationary system are equal to each other, and accordingly neither tensile force nor bending force is exerted on the recording medium sheet. Therefore, the recording table unit can be adjusted in height without possibility of damage to the recording medium sheet even during transfer of the recording medium sheet.

In accordance with still another aspect of the present invention, at least a pair of flexible guide members are provided along the transfer path of the recording medium sheet opposed to each other in the direction of thickness of the recording medium sheet with the transfer path intervening therebetween. The flexible guide members restrict movement of the recording medium sheet in the direction of thickness thereof during transfer of the recording medium sheet by the transfer means to positively guide the leading edge of the recording medium sheet from transfer means to transfer means.

DESCRIPTION OF THE PREFERRED EMBODIMENT

Figure 1:
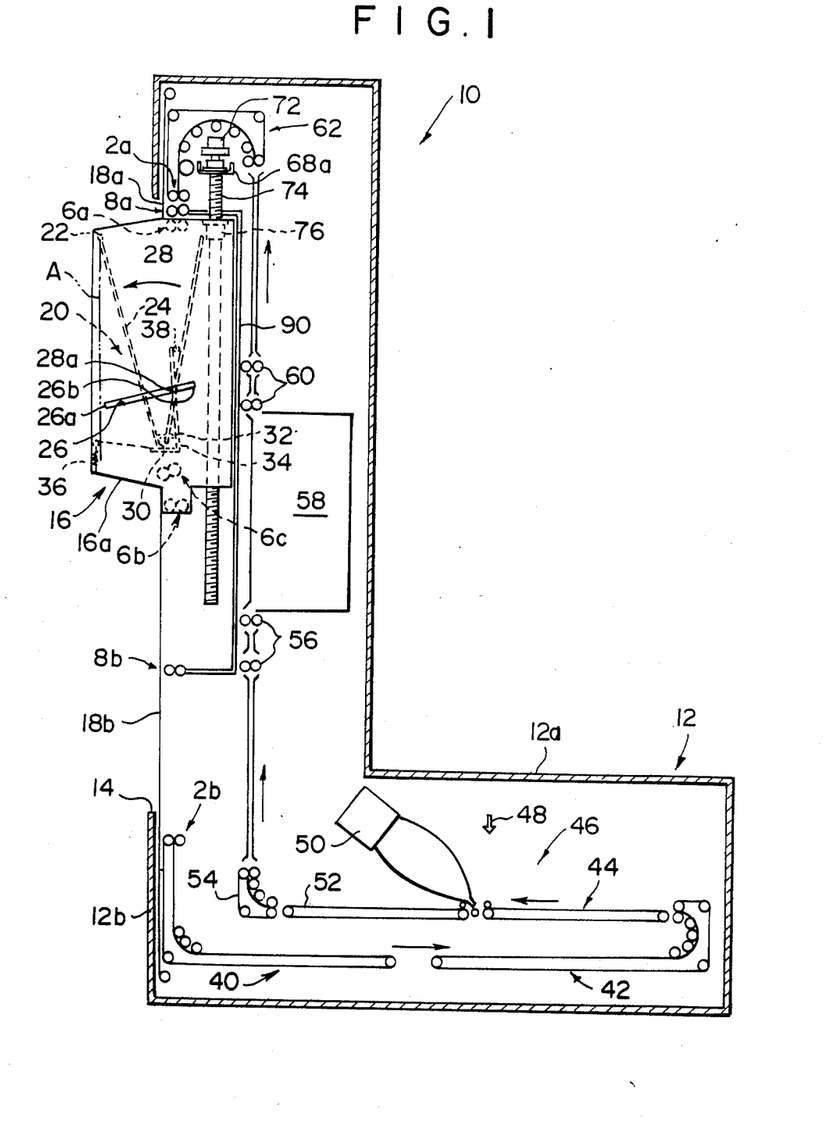
FIG. 1 is a cross sectional view of a radiation image recording apparatus in accordance with an embodiment of the present invention.
Figure 2:
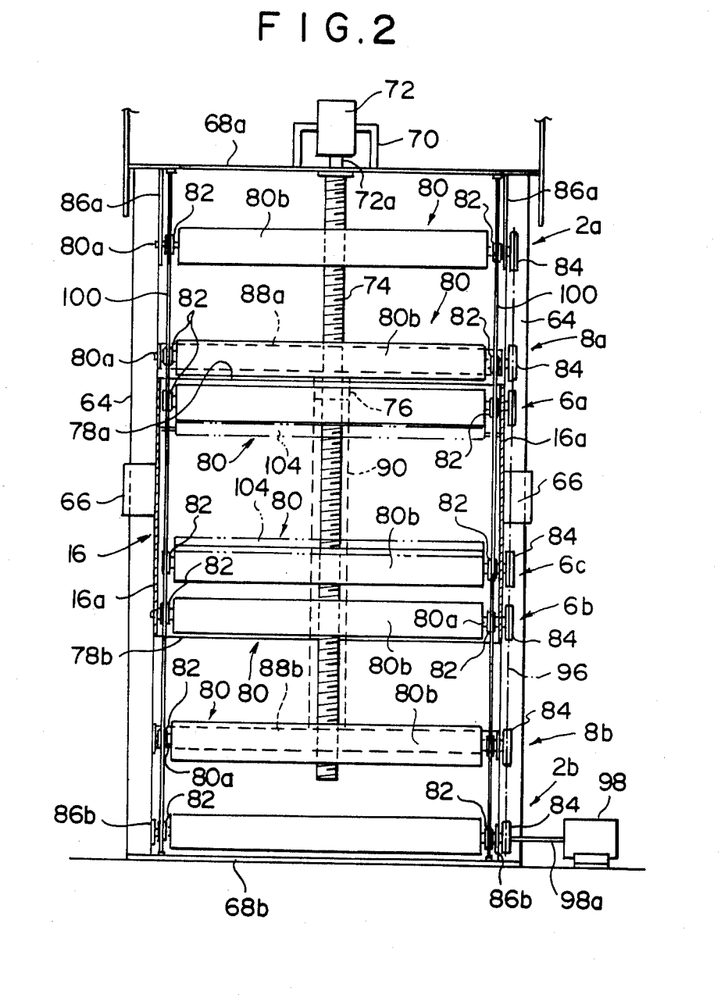
FIG. 2 is a fragmentary front elevational view of the radiation image recording apparatus of FIG. 2 with the housing being removed therefrom.
Figure 3:
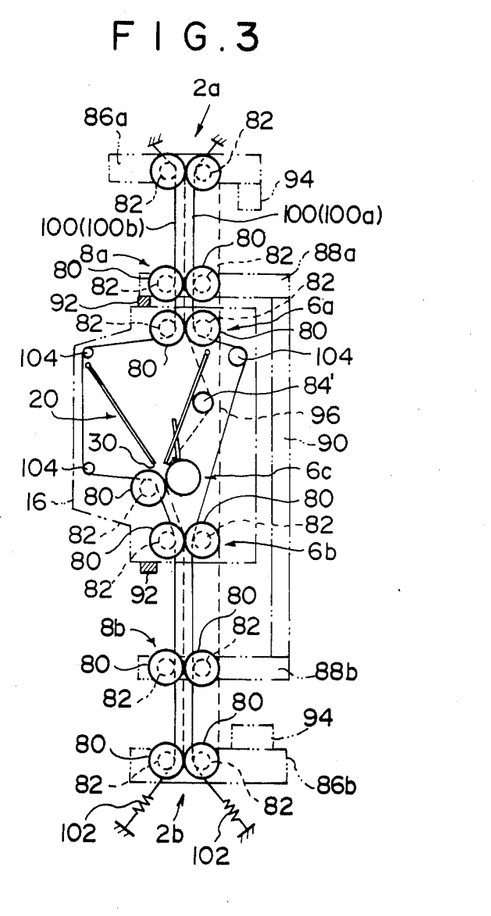
FIG. 3 is a fragmentary side elevational view of the radiation image recording apparatus of FIG. 2 with the housing being removed therefrom.

Now an embodiment of the present invention will be described in detail with reference to FIGS. 1 to 3.

A radiation image recording apparatus 10 in accordance with an embodiment of the present invention includes an L-shaped housing 12 comprising a horizontal base portion 12a and an upright portion 12b extending up from one side of the base portions 12a. A recording table unit 16 is provided to be movable up and down in an elongated opening 14 formed in the front face of the upright portion 12b to vertically extend to a length sufficient to permit the recording table unit to move over a distance longer than the length of a recording medium sheet (not shown). In order to close the opening 14 above and below the recording table unit 16, upper and lower blinds 18a and 18b are provided. The upper and lower blinds 18a and 18b are of a self-winding type and are respectively connected to the upper and lower end portions of the recording table unit 16 at the respective free ends.

In the recording table unit 16, there is disposed a recording medium holder 20 for accommodating therein the recording medium sheet introduced into the recording table unit 16. The recording medium holder comprises a first plate member 24 which is formed of, for instance, a synthetic resin having a low X-ray absorption and is pivoted on the recording table unit 16a by a pivot pin 22 at an upper end portion, and a second plate member 28 supported on the recording table unit body 16a by way of a pair of pin portions 28a received in a pair of arcuate guide grooves 26 formed in the respective side walls of the recording table unit body 16a. The first and second plate members 24 and 28 are connected by a pivot pin 32 with a space 30 for permitting passage of the recording medium sheet being defined between lower portions thereof. A lid member 34 is mounted on the pin portions 28a for pivotal motion between a closing position in which it closes the space 30 and an opening position in which it opens the same, and is urged toward the closing position under the force of a spring (not shown).

The pin portions 28a are moved back and forth between first and second ends 26a and 26b of the guide grooves 26 by a crank (not shown), for instance. When the pin portions 28a are moved further toward the second ends 26b from the position shown in FIG. 1, the lid member 34 abuts against a stopper 38 provided on the recording table unit body 16a and rotates about the stopper 38 in the counterclockwise direction to open said space 30. On the other hand, when the pin portions 28a are in the position shown in FIG. 1 and in a position deviated therefrom toward the first ends 26a of the guide grooves 26, the space 30 is closed by the lid member 34. When the recording medium holder 20 receives the recording medium sheet in the position shown in FIG. 1, the pin portions 28a are moved toward the first ends 26a of the guide grooves 26 and the recording medium holder 20 is swung, with the recording medium sheet sandwiched between the first and second plate members 24 and 28, to a recording position indicated at A in which the recording medium sheet is held near the front face of the recording table unit 16 in parallel thereto. After the recording medium sheet is exposed to X-rays, the pin portions 28a are moved toward the second ends 26b of the guide grooves 26 beyond the position shown in FIG. 1 to open the space 30 and the recording medium holder discharges the exposed recording medium sheet through the opening 30.

The recording medium sheet may be a stimulable phosphor sheet, for example. When certain kinds of phosphors are exposed to radiation such as X-rays, α-rays, β-rays γ-rays, electron beam or ultraviolet rays, they store a part of the energy of the radiation. Then when the phosphor which has been exposed to the radiation is exposed to a stimulating ray such as a visible ray, light is emitted from the phosphor in the pattern of the stored energy of the radiation. A phosphor exhibiting such properties is referred to as a stimulable phosphor and a sheet material bearing thereon a stimulable phosphor layer is referred to as a "stimulable phosphor sheet" and can be used as a recording medium for recording thereon a radiation image.

A delivery stationary transfer means 2a for delivering the recording medium sheet to the recording table unit 16 is provided adjacent to the upper edge of the opening 14, and a receiving stationary transfer means 2b for receiving from the recording table unit 16 the recording medium sheet exposed to X-rays in the recording table unit 16 is provided adjacent to the lower edge of the opening 14. The recording medium sheet bearing thereon a radiation image is fed to an image reading section 46 by way of a belt conveyor 40 associated with the receiving stationary transfer means 2b, and a belt conveyors 42 and 44 disposed downstream of the belt conveyor 40 in this order. The recording medium sheet is scanned with a stimulating ray 48 at the image reading section 46 and emits light in the pattern of the stored energy of radiation. The light emitted from the recording medium sheet is converted into an electric signal by a photoelectric converter 50 such as a photomultiplier. The electric signal is used for reproducing the radiation image stored on the recording medium sheet on a CRT, a photosensitive film or the like as a visible image. After passing through the image reading section 46, the recording medium sheet is transferred to an erasing section 58 by way of belt conveyors 52 and 54 and conveyor rollers 56. In the erasing section 58, residual radiation energy is released from the recording medium sheet by heating, exposure to light or the like. Then the recording medium sheet is transferred to the delivery stationary transfer means 2a by way of conveyor rollers 60, and a belt conveyor 62 associated with the delivery stationary transfer means 2a, and then fed to the recording table unit 16 again.

Now the transfer path along which the recording medium sheet is transferred from the delivery stationary transfer means 2a to the receiving stationary transfer means 2b by way of the recording table unit 16 will be described in detail with reference to FIGS. 2 and 3.

A pair of guide members 64 vertically extend on opposite sides of the opening 14 in the upright portion 12b of the housing 12. Said delivery and receiving stationary transfer means 2a and 2b extend between the guide members 64 respectively at an upper portion and at a lower portion thereof.

The recording table unit 16 is provided with a pair of engagement portions 66 on opposite sides thereof. The engagement portions 66 are engaged for sliding movement with the respective guide members 64. An upper frame member 68a extends across the pair of guide members 64 and is fixed to the tops of the guide members 64. An electric motor 72 as a driving device is secured to the upper frame 68a by way of a bracket 70. The electric motor 72 has an output shaft 72a to which a lead screw member 74 is fixed to extend in alignment therewith. The lead screw member 74 vertically extends through the recording table unit 16 and engages with a female screw member 76 fixed to the top of the recording table unit 16. Thus, by controlling the electric motor 72, the recording table unit 16 can be moved between the stationary transfer means 2a and 2b and can be held at a desired height.

The recording table unit 16 is provided with an inlet opening 78a (FIG. 2) at the top thereof and a receiving transfer means 6a for receiving the recording medium sheet and delivering it to the recording medium holder 20 is disposed at the inlet opening 78a. The recording table unit 16 is further provided with an outlet opening 78b at the bottom thereof, and a delivery transfer means 6b for feeding the recording medium sheet discharged from the recording medium holder 20 toward the receiving stationary transfer means 2b is disposed at the outlet opening 78b. In this particular embodiment, an auxiliary transfer means 6c is provided between the recording medium holder 20 and the delivery transfer means 6b in order to direct the recording medium sheet discharged from the recording medium holder 20 through the space 30 toward the delivery transfer means 6b. A relay transfer means 8a is disposed between the delivery stationary transfer means 2a and the receiving transfer means 6a on the recording table unit 16, and a relay transfer means 8b is disposed between the receiving stationary transfer means 2b and the delivery transfer means 6b of the recording table unit 16.

Each of the transfer means 2a, 2b, 6a, 6b, 6c, 8a and 8b comprises a pair of rollers 80. Each roller 80 has a shaft portion 80a and a roller body 80b having a uniform outer diameter. The length of the roller body 80b is smaller than the width of the recording medium sheet, the roller bodies 80b of all the transfer means being substantially equal to each other in outer diameter. Each roller 80 except one of the rollers of the auxiliary transfer means 6c is provided with a pair of pulleys 82 on the shaft portion 80a on opposite sides of the roller body 80b. The pulleys 82 have an outer diameter smaller than that of the roller body 80b. The pulleys 82 of each roller 80 are spaced from each other by a distance smaller than the width of the recording medium sheet and are mounted on the shaft portion 80a for rotation relative to the roller body 80b. One of the rollers 80 of each transfer means including the auxiliary transfer means 6c is provided with an engagement sprocket 84 fixed to one end of the shaft portion 80a. The outer diameter or the pitch diameter is substantially equal to the diameter of the roller body 80b.

The shaft portion 80b of each roller 80 of the delivery stationary transfer means 2a is supported by the upper frame member 68a by way of an upper bracket 86a, and the shaft portion 80b of each roller 80 of the receiving stationary transfer means 2b is supported by a lower frame member 68b by way of a lower bracket 86b. The shaft portions 80a of the rollers 80 of the transfer means 6a, 6b and 6c in the recording table unit 16 are supported on the side walls of the recording table unit body 16a with the sprockets 84 thereon positioned outside the recording table unit 16. A pair of support members 88a and 88b are respectively disposed above and below the recording table unit 16 to be movable up and down under the guidance of the guide members 64. The shaft portions 80a of the rollers 80 of the upper relay transfer means 8a are supported on the upper support member 88a and the shaft portions 80a of the rollers 80 of the lower relay transfer 8a means 8b are supported on the lower support member 88b. The upper support member 88a and the lower support member 8a are connected with each other by a connecting member 90 so that the upper and lower relay transfer means 8a and 8b move up and down together.

In order to prevent interference between the upper relay transfer means 8a and the receiving transfer means 6a and between the lower relay transfer means 8b and the delivery transfer means 6b, the recording table unit 16 is provided on the upper and lower surfaces with a pair of spacers 92 which are adapted to abut against the upper and lower support members 88a and 88b. Further, in order to prevent interference between the delivery stationary transfer means 2a and the upper relay transfer means 8a and between the receiving stationary transfer means 2b and the lower relay transfer means 8b, spacers 94 adapted to abut against the upper and lower support members 88a and 88b are provided on the lower surface of the upper bracket 86a and the upper surface of the lower bracket 86b.

When the electric motor 72 is energized to move upward the recording table unit 16 and the spacer 92 on the recording table unit 16 abuts against the upper support member 88a, the relay transfer means 8a and 8b are both moved upward with the recording table unit 16. The length of the connecting member 90 connecting the relay transfer means 8a and 8b is selected so that when the recording table unit 16 is at its nearest to one of the stationary transfer means 2a and 2b, both the distance between the other stationary transfer means and the relay transfer means on the side of the other stationary transfer means, and the distance between the relay transfer means on the side of the other stationary transfer means and the transfer means of the recording table unit 16 on the side of the other stationary transfer means do not exceed the length of the recording medium sheet. Therefore, the distances between adjacent transfer means which are variable are always kept not larger than the length of the recording medium sheet for any height of the recording table unit 16.

An endless driving chain 96 extends along the sprockets 84 on the shaft portion 80a of one rollers of the respective transfer means and is in driving engagement therewith. Instead of the combination of the driving chain 96 and the sprockets 84 for transmitting the driving force to the rollers 80, a combination of a timing belt and a gear on the rollers may be used. As clearly shown in FIG. 3, an idling sprocket 84' is provided in order to bring the driving chain into a positive engagement with the sprocket 84 of the auxiliary transfer means 6c which is out of alignment with the other sprockets 84. The shaft portion 80a of the roller 80 of the receiving stationary transfer means 2b provided with the sprocket 84 is connected to the output shaft 98a of an electric motor 98 so as to be coaxial therewith. The driving force of the electric motor 98 is transmitted to the rollers 80 provided with the sprocket 84 to rotate them, whereby the pair of rollers 80 of each transfer means associate with each other to transfer downward the recording medium sheet.

A pair of strip like guide members 100 extend between the upper and lower frame members 68a and 68b on each side of the roller arrays and are in engagement with the pulleys 82 of the rollers 80 of the corresponding sides. The guide members 100 may be, for instance, a belt of flexible material and restrict movement of the recording medium sheet in the direction of the thickness thereof. As clearly shown in FIG. 3, each guide member 100 extends in contact with the inner side of the pulleys 82. More particularly, out of the two guide members 100 on each side of the roller arrays, the guide member 100a on the side of the driving rollers 80 (those provided with the sprocket 84) extends in contact with the inner sides of the pulleys 82 on the driving rollers of the delivery stationary transfer means 2a, the upper relay transfer means 8a, the receiving transfer means 6a, the delivery transfer means 6b, the lower relay transfer means 8b and the receiving stationary transfer means 2b. Further, of the guide members 100 on each side of the roller arrays, the guide member 100b on the side of idle rollers 80 (those not provided with the sprocket) extends in contact with the inner sides of the pulleys 82 on the idle rollers of the delivery stationary transfer means 2a, the upper relay transfer means 8a, the receiving transfer means 6a, the auxiliary roller 6c, the delivery transfer means 6b, the lower relay transfer means 8b and the receiving stationary transfer means 2b. The upper ends of the guide members 100a and 100b are fixed to the upper frame member 68a so that the upper end portions of the guide members 100a and 100b progressively diverge away from each other upwardly. The lower ends of the guide members 100a and 100b are fixed to the lower frame member 68b so that the lower end portions of the guide members 100a and 100b progressively diverge away from each other downwardly. Each guide member 100 is fixed to the lower frame member 68b by way of tensioning spring 102. A plurality of idle pulleys 104 diverge the guide members 100a and 100b away from each other at a portion between the receiving transfer means 6a and the delivery transfer means 6b in order to prevent interference with the recording medium holder 20 disposed between the transfer means 6a and 6b.

When the electric motor 98 is energized and the rollers 80 of the transfer means 2a, 2b, 6a, 6b, 6c, 8a and 8b are simultaneously driven, a recording medium sheet fed between the rollers 80 of the delivery stationary transfer means 2a is delivered, by way of upper relay transfer means 8a, to the receiving transfer means 6a in the recording table unit 16 which may be at any desired height, and introduced into the recording table unit 16 by the rollers 80 of the receiving transfer means 6a.

When the recording medium sheet is transferred to the recording table unit 16, the spaces between the delivery stationary transfer means 2a and the upper relay transfer means 8a, and between the upper relay transfer means 8a and the receiving transfer means 6a are kept smaller than the length of the recording medium sheet irrespective of the height of the recording table unit 16, and accordingly, the recording medium sheet is always held by at least one of the delivery stationary transfer means 2a, the upper relay transfer means 8a and the receiving transfer means 6a, whereby the recording medium sheet is not permitted to fall, so possible damage to the recording medium sheet is thereby avoided.

The recording medium sheet introduced into the recording table unit 16 through the receiving transfer means 6a is exposed to X-rays while being held by the recording medium holder 20 as described above and is subsequently fed between the rollers 80 of the auxiliary transfer means 6c through said space 30 at the bottom of the recording medium holder 20. Then the recording medium sheet is fed from the auxiliary transfer means 6c to the delivery transfer means 6b to be discharged from the recording table unit 16 through the outlet opening 78b, and is further fed between the rollers 80 of the receiving stationary transfer means 2b by way of the lower relay transfer means 8b. When the recording medium sheet is transferred to the receiving stationary transfer means 2b from the recording table unit 16, the spaces between the delivery transfer means 6b and the lower relay transfer means 8b, and between the lower relay transfer means 8b and the receiving stationary transfer means 2b are kept smaller than the length of the recording medium sheet irrespective of the height of the recording table unit 16, and accordingly, the recording medium sheet is always held by at least one of the delivery transfer means 6b, the lower relay transfer means 8b and the receiving stationary transfer means 2b, whereby the recording medium sheet is not permitted to fall, so possible damage to the recording medium sheet is thereby avoided.

Thus, in the radiation image recording apparatus of this embodiment, the vertical position of the recording table unit 16 can be freely adjusted according to the part of object to be photographed without possibility of damage to the recording medium sheet during transfer of the recording medium sheet to and from the recording table unit 16.

Further, in the radiation image recording apparatus of this embodiment, the rollers 80 of all the transfer means are substantially equal to each other in the outer diameter of the roller body 80b, and the pitch diameter of the engagement sprocket 84 of each roller 80 by way of which the driving force of the electric motor 98 is transmitted to the roller 80 is substantially equal to the outer diameter of the roller body 80b. This arrangement is advantageous in that even when the recording table unit 16 is moved and the relay transfer means 8a and 8b are moved in response to the movement of the recording table unit with the recording medium sheet being simultaneously sandwiched by rollers 80 of two transfer means, i.e., the delivery stationary transfer means 2a and the relay transfer means 8a, or the relay transfer means 8a and the receiving transfer means 6a, during transfer of the recording medium sheet to the recording table unit 16, the transfer velocities of the recording medium sheet by the pair of rollers 80 of the transfer means as seen from the stationary system are equal to each other, and accordingly neither tensile force nor bending force is exerted on the recording medium sheet. Therefore, the recording table unit 16 can be adjusted in height without damage to the recording medium sheet even during transfer of the recording medium sheet. Though in this embodiment, the rollers 80 of all the transfer means are substantially equal to each other in the outer diameter of the roller body 80b, the rollers 80 may differ in the outer diameter from transfer means to transfer means so long as the pitch diameter of the engagement sprocket 84 is equal to the outer diameter of the roller body 80b in each transfer means.

The relation between the outer diameter of the roller 80 and the pitch diameter of the engagement sprocket 84 will now be described in detail hereinbelow.

When it is assumed that the outer diameter D and the pitch diameter d are not equal to each other, the following formula is satisfied.

$$V' = (V-v)D/d + v \tag{6}$$

wherein V and V' respectively represent the velocity of the driving chain 96 and the transfer velocity of the recording medium sheet by the rollers 80 as seen from the stationary system, and V represents the velocity of upward or downward movement of the rollers 80 relative to the stationary system. The first term of the right side of the formula (6) represents the peripheral velocity of the rollers 80 as seen from the moving system and accordingly, the formula (6) can be rewritten as follows.

$$V' = VD/d - (1 - D/d)v \tag{6'}$$

As can be understood from the formula (6'), when the outer diameter D of the roller 80 and the pitch diameter d of the sprocket 84 are equal to each other, i.e., when D/d=1, the velocity of the driving chain 96 and the transfer velocity of the recording medium sheet by the rollers 80 as seen from the stationary system are equal to each other whether or not the rollers 80 move upward or downward. It is preferred that the difference between the outer diameter of the roller 80 and the pitch diameter of the engagement sprocket 84 be 2% at most.

Further, said guide members 100 restrict movement of the recording medium sheet in the direction of the thickness of the recording medium sheet during transfer of the same and positively guide the leading edge of the recording medium sheet between the rollers 80 of the successive transfer means even when the recording table unit 16 is moved to adjust the height thereof, thereby preventing damage to the leading edge of the recording medium sheet and ensuring more positive transfer of the recording medium sheet.

In the embodiment described above, each roller 80 has a roller body 80b which has a length smaller than the width of the recording medium sheet and a pair of pulleys 82 are provided on opposite sides of the roller body 80b in order to guide the respective guide members 100. However, the roller body 80b may be longer than the width of the recording medium sheet. In this case, a pair of annular grooves are formed on the roller spaced from each other in the longitudinal direction of the roller by a distance smaller than the width of the recording medium sheet, and the guide members are passed through the annular grooves. Further, in the embodiment described above, a pair of opposed guide members 100 are provided on each side of the roller body 80b. However, only a pair of opposed guide members may be provided on one side of the roller body 80b. Further, though in the embodiment described above, each guide member is connected to the lower frame member 68b by way of the spring 102 fixed to the lower end thereof, the spring 102 may be inserted into an intermediate portion of the guide member 100, or may be eliminated.

Though in the embodiment described above, only one pair of relay transfer means are provided, two or more pairs of relay transfer means may be provided depending on the distance between the delivery and receiving stationary transfer means or the desired movable distance of the recording table unit 16.

Now the relation between the number of relay transfer means and the distance between the delivery and receiving stationary transfer means will be described with reference to FIG. 4.

Figure 4:
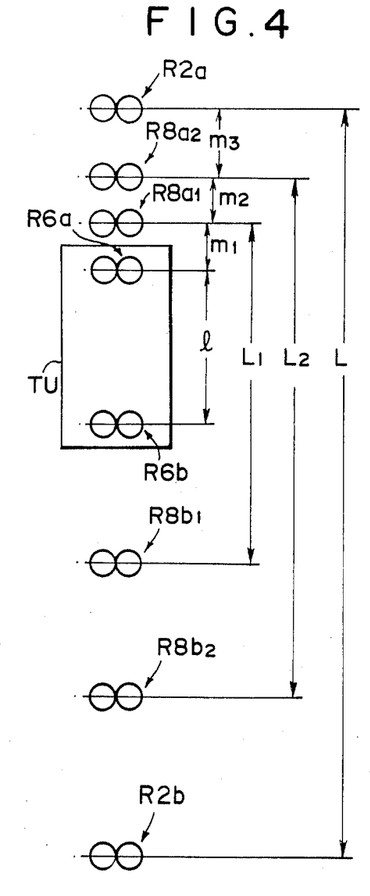
FIG. 4 is a schematic view for illustrating the principle of operation of the radiation image recording apparatus in accordance with the present invention.

In FIG. 4, a delivery stationary transfer means R2a and a receiving stationary transfer means R2b are fixedly provided spaced from each other by a distance L which is sufficiently larger than the length S of a recording medium sheet. A recording table unit TU is movable back and forth between the delivery and receiving stationary transfer means R2a and R2b. A receiving transfer means R6a and a delivery transfer means R6b are provided to move back and forth carried by the recording table unit TU. A pair of first relay transfer means R8a1 and R8b1 are disposed respectively between the delivery stationary transfer means R2a and the receiving transfer means R6a and between the receiving stationary transfer means R2b and the delivery transfer means R6b. A pair of second relay transfer means R8a2 and R8b2 are disposed respectively between the delivery stationary transfer means R2a and the first relay transfer means R8a1 on the delivery side, and between the receiving stationary transfer means R2b and the first relay transfer means R8b1 on the receiving side. Each of the transfer means R2a, R2b, R6a, R6b, R8a1, R8a2, R8b1 and R8b2 comprises a pair of rollers at least one of which is driven. The receiving transfer means R6a and the delivery transfer means R6b on the recording table unit TU are spaced from each other by a distance l larger than the length S of the recording medium sheet to accommodate therebetween a recording medium holder for holding the recording medium sheet. When each transfer means comprises a pair of rollers, the distance between a pair of transfer means is the distance between a plane including the rotational axes of the rollers of one of the pair of transfer means and a plane including the rotational axes of the rollers of the other transfer means. The first relay transfer means R8a1 and R8b1 are spaced from each other by a distance L1 and are movable back and forth between the stationary transfer means R2a and R2b integrally with each other with the distance L1 therebetween being fixed. The second relay transfer means R8a2 and R8b2 are spaced from each other by a distance L2 and are movable back and forth between the pair of stationary transfer means R2a and R2b integrally with each other with the distance L2 therebetween being fixed. FIG. 4 shows the condition in which the recording table unit is moved to the uppermost position and the delivery stationary transfer means R2a, second relay transfer means R8a2 on the delivery side, first relay transfer means R8a1 on the delivery side and receiving transfer means R6a on the recording table unit are positioned nearest each other. The distances between the receiving transfer means R6a and the first relay transfer means R8a1, between the first relay transfer means R8a1 and the second relay transfer means R8a2 and between the second relay transfer means R8a2 and the delivery stationary transfer means R2a in this condition are respectively denoted by $m_1$, $m_2$ and $m_3$. The distances $m_1$ to $m_3$ will be referred to as "the shortest distance", hereinbelow.

In order that the recording medium sheet is always held by at least one of the transfer means while it is delivered to the recording table unit from the delivery stationary transfer means R2a and discharged therefrom to the receiving stationary transfer means R2b, spaces between adjacent transfer means (except the space between the receiving transfer means R6a and the delivery transfer means R6b which is fixed) which change with movement of the recording table unit must be smaller than the length S of the recording medium sheet at the maximum. That is, the distance L between the stationary transfer means R2a and R2b, the distance L1 between the first relay transfer means R8a1 and R8b1, the distance L2 between the second relay transfer means R8a2 and R8b2, the distance l between the receiving transfer means R6a and the delivery transfer means R6b, the length S of the recording medium sheet and the shortest distances $m_1$, $m_2$ and $m_3$ must satisfy the following conditions.

$$L1-(l+m_1)<S \qquad (1)$$

$$L2-(L1+m_2)<S \qquad (2)$$

$$L-(L2+m_3)<S \qquad (3)$$

The number of relay transfer means required to transfer the recording medium sheet without releasing it and the distance between each pair of relay transfer means to be integrally moved maintaining the distance therebetween can be obtained as follows. For the purpose of simplification, the shortest distances between adjacent transfer means are assumed to be all m.

The number of required relay transfer means is determined depending on the number of the values of the sum of the shortest distance between adjacent transfer means and the length S of the recording medium sheet (S+m) included in the difference between the distance L between the stationary transfer means R2a and R2b and the distance l between the receiving transfer means R6a and the delivery transfer means R6b (L−l). That is, the number of the relay transfer means should be not smaller than the integral part of the quotient of (L−l)/(S+m).

The distance between each of the pair of relay transfer means to be integrally moved maintaining the distance therebetween is selected to satisfy the following formula.

$$L_n - L_{n-1} - m < S \quad (4)$$

wherein $L_n$ represents the distance between n-th pair of relay transfer means as numbered from the recording table unit and $L_{n-1}$ represents the distance between (n−1)-th pair of relay transfer means, $L_0$, i.e., $L_{n-1}$ when n=1, representing the space l between the receiving transfer means R6a and the delivery transfer means R6b.

By selecting the number of the relay transfer means and the space between each pair of relay transfer means in the manner described above, the spaces between adjacent pairs of transfer means (except the space between the receiving transfer means R6a and the delivery transfer means R6b in the recording table unit) can be kept smaller than the length S of the recording medium sheet regardless of the position of the recording table unit. The shortest distances between adjacent pairs of transfer means need not be the same but may vary from pair to pair. In the latter case, the following condition should be satisfied.

$$L - l < \sum_{n=1}^{n} (m_n + nS) \quad (5)$$

The number of the required relay transfer means is given by the value of n which satisfies the condition (5). That is, the values of the shortest distances $m_n$ are successively determined from n=1 or from the relay transfer means pair nearest to the recording table unit, and the value of n which satisfies the condition (5) is employed.

We claim:

1. A radiation image recording table comprising a delivery stationary transfer means and a receiving stationary transfer means fixedly provided spaced from each other, a recording table unit which is movable back and forth between the delivery stationary transfer means and the receiving stationary transfer means, and is provided with a receiving transfer means for introducing a recording medium sheet into the recording table unit and a delivery transfer means for discharging the recording medium sheet from the recording table unit, and at least one pair of relay transfer means which are movable in the direction of movement of the recording table unit integrally with each other, one between the delivery stationary transfer means and the receiving transfer means, and the other between the receiving stationary transfer means and the delivery transfer means, the recording table unit and the relay transfer means being movable within a range in which the spaces between the delivery stationary transfer means and said one relay transfer means, between the receiving transfer means and said one relay transfer means, between the delivery transfer means and said the other relay transfer means and between the receiving stationary transfer means and said the other relay transfer means are not larger than the length of the recording medium sheet.

2. A radiation image recording table as defined in claim 1 in which each of the delivery stationary transfer means, the pair of relay transfer means, the receiving transfer means, the delivery transfer means and the receiving stationary transfer means comprises a pair of rollers at least one of which is driven to rotate, the rollers being arranged to associate with each other to transfer the recording medium sheet inserted therebetween.

3. A radiation image recording table as defined in claim 2 in which said recording medium sheet is a stimulable phosphor sheet.

4. A radiation image recording table as defined in claim 3 further comprising an image reading section for reading a radiation image on the recording medium sheet and an erasing section for releasing residual radiation energy on the recording medium sheet, the recording medium sheet being returned to said delivery stationary transfer means after passing through the image reading section and the erasing section.

5. A radiation image recording table as defined in claim 4 in which said image reading section comprises a stimulating ray source for emitting stimulating rays and a photoelectric reading device for receiving light emitted from the stimulable phosphor sheet upon exposure to the stimulating rays and converting it into an image signal.

6. A radiation image recording table as defined in claim 2 further comprising a roller driving means for rotating said at least one roller of each transfer means, said at least one roller being provided with an engagement portion by way of which driving force for rotating the roller is transmitted thereto and said roller driving means includes an endless driving force transmission means drivingly engaged with the engagement portions of the rollers to be driven.

7. A radiation image recording table as defined in claim 6 in which said endless driving force transmission means comprises a chain and said engagement portion is a sprocket fixedly provided to the roller to rotate integrally with the roller coaxially therewith.

8. A radiation image recording table as defined in claim 6 in which said endless driving force transmission means comprises a timing belt and said engagement portion is a gear fixedly provided to the roller to rotate integrally with the roller coaxially therewith.

9. A radiation image recording table as defined in claim 6 in which said recording table unit further comprises a recording medium holder which is disposed between said receiving transfer means and said delivery transfer means and holds the recording medium sheet introduced into the recording table unit by the receiving transfer means in a recording position, and an auxiliary transfer means for transferring the recording medium sheet discharged from the recording medium holder to the delivery transfer means.

10. A radiation image recording table as defined in claim 6 in which said engagement portion on each roller has an outer diameter substantially equal to the diameter of the roller.

11. A radiation image recording table as defined in claim 1 further comprising at least a pair of strip-like flexible guide members which extend along the transfer path of the recording medium sheet opposed to each other in the direction of the thickness of the recording medium sheet interposing therebetween the transfer path in order to guide the recording medium sheet from transfer means to transfer means.

12. A radiation image recording table as defined in claim 11 in which each of the delivery stationary transfer means, the pair of relay transfer means, the receiving transfer means, the delivery transfer means and the receiving stationary transfer means comprises a pair of rollers at least one of which is driven to rotate, the rollers being arranged to associate with each other to transfer the recording medium sheet inserted therebetween.

13. A radiation image recording table as defined in claim 12 in which two pairs of said opposed flexible guide members are provided, one pair of the opposed flexible guide members being spaced from the other pair of the opposed flexible guide members in the longitudinal direction of each pair of rollers by a distance smaller than the width of the recording medium sheet.

14. A radiation image recording table as defined in claim 13 in which each of said flexible guide members is engaged with one of a pair of pulleys which are provided on opposite sides of the roller body of each roller to rotate with respect to the roller body about the rotational axis of the roller body, the pulleys being spaced from each other by said distance smaller than the width of the recording medium sheet.

15. A radiation image recording table as defined in claim 14 in which said flexible guide members in each pair diverge from each other toward each end thereof and at least one end of each flexible guide member is fixed by way of a spring member.

16. A radiation image recording table as defined in claim 15 in which said recording table unit further comprises a recording medium holder which is disposed between said receiving transfer means and said delivery transfer means and holds the recording medium sheet introduced into the recording table unit by the receiving transfer means in a recording position, one pair of said opposed flexible guide members being largely spaced from the other at a portion corresponding to the recording medium holder to prevent interference with the recording medium holder.

17. A radiation image recording apparatus comprising a delivery stationary transfer means and a receiving stationary transfer means fixedly provided spaced from each other; a recording table unit which is movable back and forth between the delivery stationary transfer means and the receiving stationary transfer means, and is provided with a transfer means for introducing a recording medium sheet fed from the delivery stationary transfer means into the recording table unit and discharging it from the same to the receiving stationary transfer means; each of the delivery stationary transfer means, the transfer means of the recording table unit and the receiving stationary transfer means including a pair of rollers at least one of which is driven to rotate, the rollers being arranged to associate with each other to transfer the recording medium sheet inserted therebetween; and a roller driving means for rotating said at least one roller of each transfer means; said at least one roller being provided with an engagement portion by way of which driving force for rotating the roller is transmitted thereto, said roller driving means including an endless driving force transmission means drivingly engaged with the engagement portions of the rollers to be driven, and said engagement portion on each roller having an outer diameter substantially equal to the diameter of the roller.

18. A radiation image recording apparatus comprising a delivery stationary transfer means and a receiving stationary transfer means fixedly mounted on a frame member spaced from each other; a recording table unit which is movable back and forth between the delivery stationary transfer means and the receiving stationary transfer means, and is provided with a receiving transfer means for introducing a recording medium sheet fed from the delivery stationary transfer means into the recording table unit and a delivery transfer means for discharging it from the same to the receiving stationary transfer means; and at least a pair of strip-like flexible guide members which extend along the transfer path of the recording medium sheet opposed to each other in the direction of thickness of the recording medium sheet interposing therebetween the transfer path in order to guide the recording medium sheet from transfer means to transfer means, each end of each guide member being fixed to the frame member.

* * * * *